United States Patent
Hilbert et al.

(10) Patent No.: US 10,048,690 B1
(45) Date of Patent: Aug. 14, 2018

(54) METHOD AND SYSTEM FOR CONTROLLING TWO OR MORE PROPULSION DEVICES ON A MARINE VESSEL

(71) Applicant: Brunswick Corporation, Lake Forest, IL (US)

(72) Inventors: David J. Hilbert, Black Creek, WI (US); Brian J. Fregonese, Fond du Lac, WI (US); Christopher R. Jenks, Rosendale, WI (US)

(73) Assignee: Brunswick Corporation, Mettawa, IL (US)

( * ) Notice: Subject to any disclaimer, the term of this patent is extended or adjusted under 35 U.S.C. 154(b) by 101 days.

(21) Appl. No.: 15/368,126

(22) Filed: Dec. 2, 2016

(51) Int. Cl.
  *G05D 1/02* (2006.01)
  *B63H 25/42* (2006.01)
  *B63H 5/08* (2006.01)

(52) U.S. Cl.
  CPC ............ *G05D 1/0206* (2013.01); *B63H 5/08* (2013.01); *B63H 25/42* (2013.01)

(58) Field of Classification Search
  CPC ......... G05D 1/0206; B63H 5/08; B63H 25/42
  See application file for complete search history.

(56) References Cited

U.S. PATENT DOCUMENTS

| | | | |
|---|---|---|---|
| 3,704,077 A * | 11/1972 | Meyers | B63H 3/10 416/30 |
| 4,962,718 A * | 10/1990 | Gornstein | B63H 23/18 114/274 |
| 6,234,853 B1 | 5/2001 | Lanyi et al. | |
| 7,267,068 B2 | 9/2007 | Bradley et al. | |
| 7,305,928 B2 | 12/2007 | Bradley et al. | |
| 7,467,595 B1 | 12/2008 | Lanyi et al. | |
| 8,478,464 B2 | 7/2013 | Arbuckle et al. | |
| 8,777,681 B1 | 7/2014 | McNalley et al. | |
| 8,807,059 B1 | 8/2014 | Samples et al. | |
| 8,925,414 B1 | 1/2015 | Park et al. | |
| 9,039,468 B1 | 5/2015 | Arbuckle et al. | |
| 9,248,898 B1 | 2/2016 | Kirchhoff et al. | |
| 2006/0054067 A1 * | 3/2006 | Hoberman | B63H 25/44 114/145 R |
| 2007/0093147 A1 * | 4/2007 | Mizutani | B63H 20/00 440/1 |
| 2013/0115832 A1 * | 5/2013 | Suzuki | B63H 21/14 440/1 |

OTHER PUBLICATIONS

Unpublished U.S. Appl. No. 15/246,681, filed Aug. 25, 2016.

* cited by examiner

*Primary Examiner* — Mary Cheung
(74) *Attorney, Agent, or Firm* — Andrus Intellectual Property Law, LLP

(57) ABSTRACT

A method of controlling two or more propulsion devices on a marine vessel includes receiving a vessel speed, determining that the vessel speed is below a first vessel speed threshold, receiving an operator thrust demand, and determining that the operator thrust demand is below a first demand threshold. At least one of the two or more propulsion devices is then turned off, and a thrust output of at least one remaining propulsion device is adjusted based on the operator thrust demand.

20 Claims, 7 Drawing Sheets

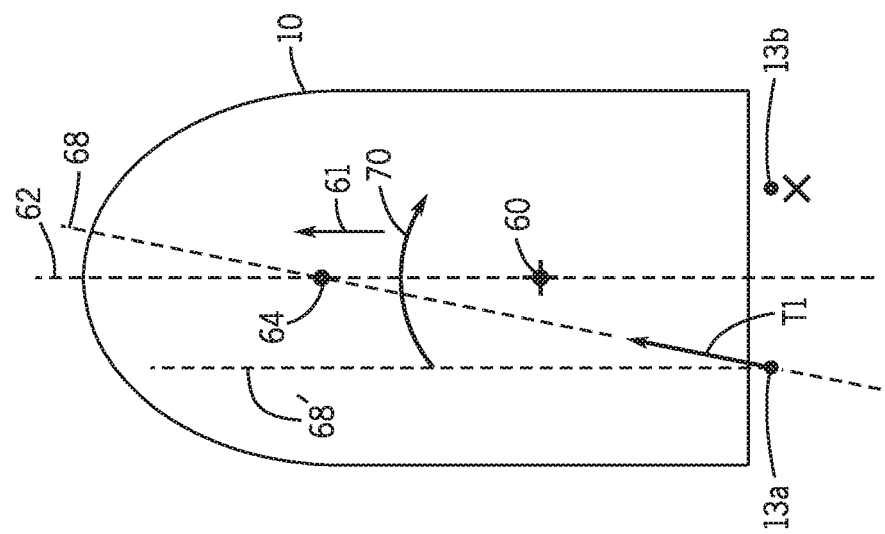
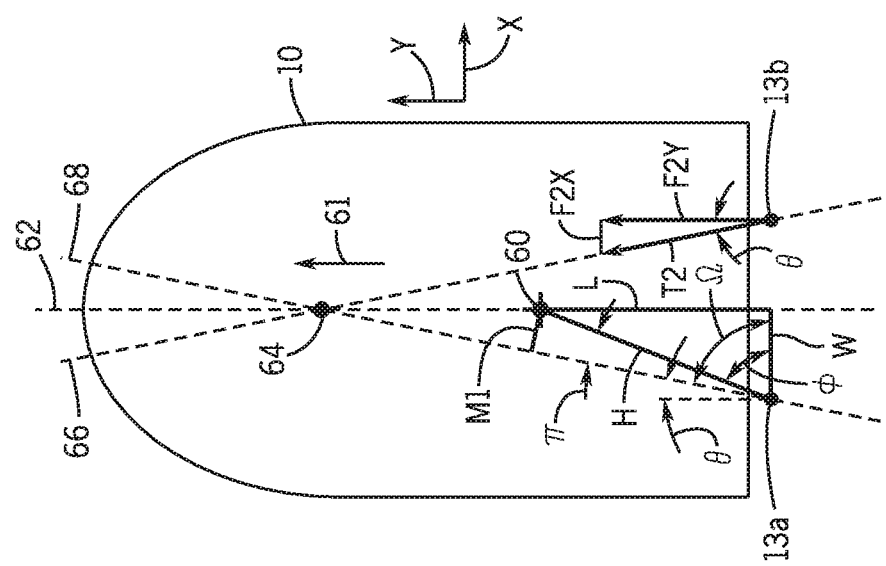
FIG. 4A
FIG. 4B

METHOD AND SYSTEM FOR CONTROLLING TWO OR MORE PROPULSION DEVICES ON A MARINE VESSEL

FIELD

The present disclosure relates to systems and methods for controlling movement of a marine vessel in a body of water, and more specifically to systems and methods for controlling two or more propulsion devices to selectively deactivate, or turn off, a subset of the propulsion devices.

BACKGROUND

The following U.S. Patents and Applications provide background information and are incorporated herein by reference in entirety.

U.S. Pat. No. 6,234,853 discloses a docking system which utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

U.S. Pat. No. 7,267,068 discloses a marine vessel maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,467,595 discloses a method for controlling the movement of a marine vessel that rotates one of a pair of marine propulsion devices and controls the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

U.S. Pat. No. 8,478,464 discloses systems and methods for orienting a marine vessel to enhance available thrust in a station keeping mode. A control device having a memory and a programmable circuit is programmed to control operation of a plurality of marine propulsion devices to maintain orientation of a marine vessel in a selected global position. The control device is programmed to calculate a direction of a resultant thrust vector associated with the plurality of marine propulsion devices that is necessary to maintain the vessel in the selected global position. The control device is programmed to control operation of the plurality of marine propulsion devices to change the actual heading of the marine vessel to align the actual heading with the thrust vector.

U.S. Pat. No. 8,807,059 discloses systems for maneuvering a marine vessel including an input device for requesting lateral movement of the marine vessel with respect to the longitudinal axis and a plurality of propulsion devices including at least a port propulsion device, a starboard propulsion device and an intermediate propulsion device disposed between the port and starboard propulsion devices. A control circuit controls orientation of the port and starboard propulsion devices inwardly towards a common point on the marine vessel, and upon a request for lateral movement of from the input device, operates one of the port and starboard propulsion devices in forward gear, operates the other of the port and starboard propulsion devices in reverse gear, and operates the intermediate propulsion device in reverse gear.

U.S. Pat. No. 9,039,468 discloses a system that controls speed of a marine vessel and includes first and second propulsion devices that produce first and second thrusts to propel the marine vessel. A control circuit controls orientation of the propulsion devices between an aligned position in which the thrusts are parallel and an unaligned position in which the thrusts are non-parallel. A first user input device is moveable between a neutral position and a non-neutral detent position. When the first user input device is in the detent position and the propulsion devices are in the aligned position, the thrusts propel the marine vessel in a desired direction at a first speed. When a second user input device is actuated while the first user input device is in the detent position, the propulsion devices move into the unaligned position and propel the marine vessel in the desired direction at a second, decreased speed without altering the thrusts.

Unpublished U.S. patent application Ser. No. 15/246,681 discloses a method for controlling movement of a marine vessel near an object that includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling two or more propulsion devices on a marine vessel includes receiving a vessel speed, determining that the vessel speed is below a first vessel speed threshold, receiving an operator thrust demand, and determining that the operator thrust demand is below a first demand threshold. At least one of the two or more propulsion devices is then turned off, and a thrust output of at least one remaining propulsion device is adjusted based on the operator thrust demand.

One embodiment of a marine propulsion system on a marine vessel includes two or more propulsion devices and a control module in communication with each of the two or more propulsion devices. The control module is configured to determine that a vessel speed is below a first vessel speed threshold and that an operator thrust demand is below a first demand threshold. At least one of the two or more propulsion devices is then turned off and a thrust output of at least one remaining propulsion device is adjusted based on the operator thrust demand.

Various other features, objects, and advantages of the invention will be made apparent from the following description taken together with the drawings.

BRIEF DESCRIPTION OF THE DRAWINGS

The present disclosure is described with reference to the following Figures.

FIGS. 4A and 4B are schematic diagrams illustrating exemplary force vector arrangements causing forward movement of the marine vessel.

DETAILED DESCRIPTION

Figure 1:
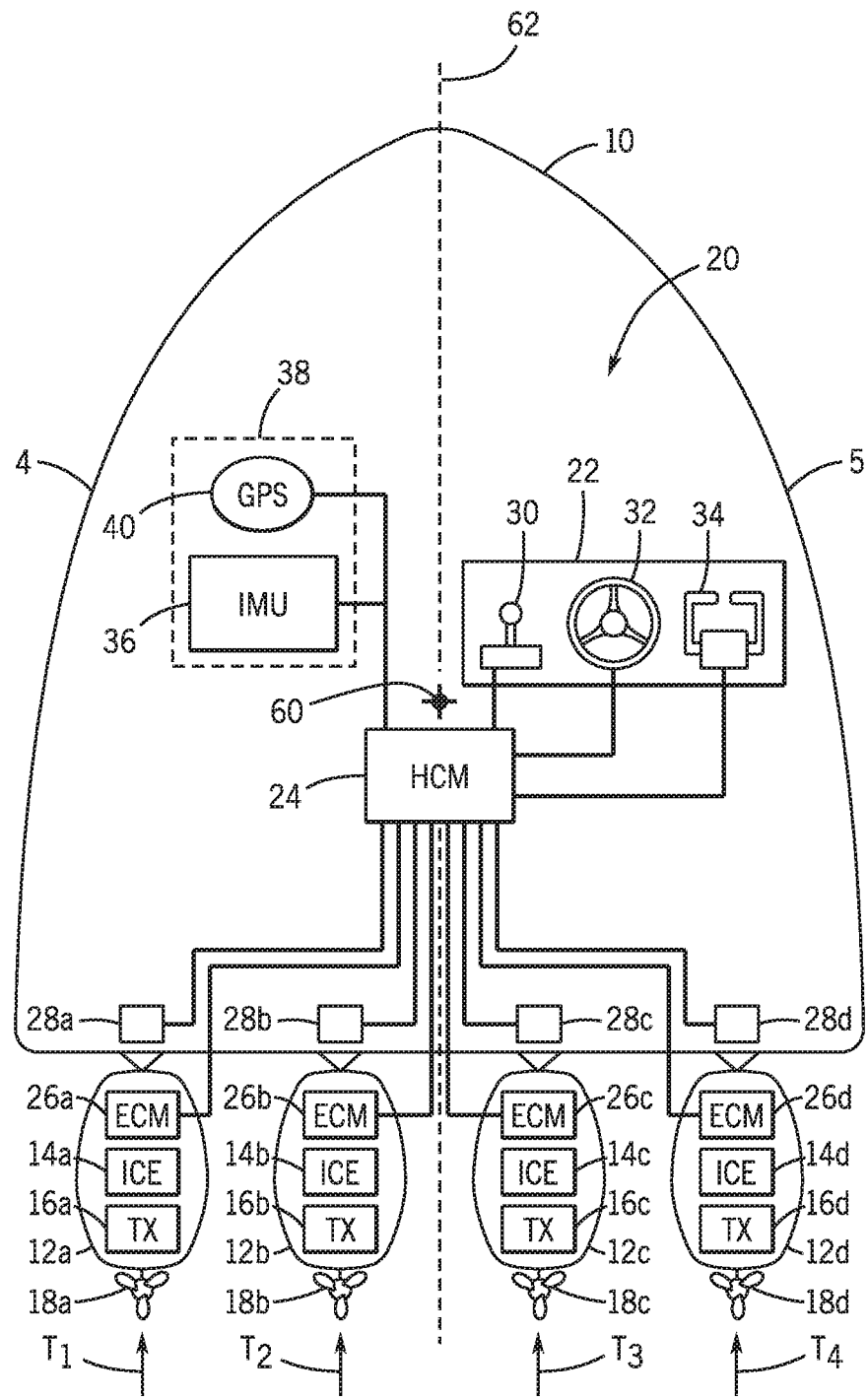
FIG. 1 is a schematic representation of a marine propulsion system on a marine vessel.

FIG. 1 provides a schematic view of a marine vessel 10 having a propulsion system 20. In the embodiment of FIG. 1, the propulsion system 20 includes four propulsion devices rotatably connected to the stern of the marine vessel 10 between the port side 4 and the starboard side 5, including an outer port propulsion device 12a, and an inner port propulsion device 12b, an inner starboard propulsion device 12c, and an outer starboard propulsion device 12d. Other embodiments of propulsion systems 20 may include any number of two or more propulsion devices, which are preferably arranged symmetrically with respect to the center line 62 of the marine vessel 10. To provide other, non-limiting, examples, the propulsion system 20 may include two, three, or five propulsion devices 12.

Through their experimentation and research in the relevant field, the present inventors have recognized that a sizeable amount of the run time of an average propulsion device on a marine vessel 10 is spent operating at idle or at low speed and light load conditions, such as station keeping, trolling, docking, or the like. In such conditions, only a small fraction of the available power of each propulsion device is required. Accordingly, the present inventors have recognized that the same power and steering output may be accomplished using only a subset of the propulsion devices 12 in a multi-engine propulsion system 20. Further, the inventors have recognized that reducing the number of propulsion devices in operation at any given time increases fuel efficiency and decreases maintenance costs by reducing the amount of run time of any given propulsion device.

In recognition of the foregoing problems and challenges in the relevant art, the present inventors developed the disclosed system where one or more of the propulsion devices 12 in the system 20 are turned off during periods of idle or under light load conditions. The steering and/or propulsion behavior of the remaining operating propulsion device(s) 12 is adjusted to compensate for the device(s) that are turned off. Operation of the various propulsion devices 12 (e.g., 12a-12d) in the system can be rotated based on the number of run-time hours for each device in order to maintain the run-time hours of each of the propulsion devices 12 in the system approximately equivalent. Thereby, the run time of all of the propulsion devices 12 in the system 20 are reduced approximately equally and the same maintenance schedule can be maintained for all of the propulsion devices 12. In certain embodiments, this reduced operation strategy, or feature, may be selectively activated or deactivated by a user, such as via a user interface.

The propulsion system 20 is capable of operating, for example, in a normal operating mode, a waypoint tracking mode, an auto heading mode, a station keeping mode, and a joysticking mode, among other modes, as described herein below and in the disclosures incorporated herein by reference. In the depicted embodiment, the propulsion system 20 includes four propulsion devices 12a-12d that each produce a thrust T1-T4 to propel the marine vessel 10, as will be more fully described herein. The propulsion devices 12a-12d illustrated in the example are outboard motors. However, a person having ordinary skill in the art will understand in light of the present disclosure that the propulsion devices 12a-12d could alternatively be inboard motors, stern drives, or pod drives. Each propulsion device is provided with an internal combustion engine (ICE or "engine") 14a-14d operatively connected to a transmission 16a-16d, which is in turn operatively connected to a propeller 18a-18d.

The propulsion system 20 also includes various control elements, which in the depicted embodiment are exemplified by an engine control module (ECM) 26a-26d on or associated with each propulsion device 12a-12d and a helm control module 24 communicatively connected to each ECM 26a-26d. The marine propulsion system 20 further comprises an operation console 22 having various input devices in signal communication, for example via a CAN bus as described in U.S. Pat. No. 6,273,771 which is hereby incorporated by reference in its entirety, with a control module, which in he depicted embodiment is exemplified HCM 24. Each of the HCM 24 and the ECMs 26a-26d may include a memory and a programmable processor. In other examples of the system 20, the various elements are connected via wireless communication rather than by a serially-wired CAN bus. It should be noted that the lines shown in FIG. 1 are meant only to demonstrate that the various control elements are capable of communicating with one another, and do not represent actual wiring connections between the various elements, nor do they represent the only paths of communication between the elements.

The systems and methods described herein may be implemented by one or more computer programs executed by one or more processors, which may all operate as part of a single control module. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As used herein, the term module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Accordingly, in other embodiments of the propulsion system 20, the functions of the ECMs 26a-26d and the HCM 24 may be provided with fewer control modules or more control modules than in the depicted embodiment. For instance, another exemplary propulsion system 20 may incorporate multiple helm control modules 24 that are communicatively connected and cooperate to provide the control functions described herein. In other embodiments, some or all of the control functions may be provided by one or more of the ECMs 26a-26d, which may be communicatively connected to one another.

The operation console 22 includes a number of user input devices, such as a joystick 30, a steering wheel 32, and one or more throttle/shift levers 34. Each of these devices inputs commands to the HCM 24. The HCM 24 in turn communicates with the propulsion devices 12a-12d by communicating with the ECMs 26a-26d. The HCM 24 also receives information from an inertial measurement unit (IMU) 36. The IMU 36 comprises a portion of a global positioning system (GPS) 38 which, in the example shown, also comprises a GPS receiver 40 located at a pre-selected fixed position on the marine vessel 10, which provides information related to the global position of the marine vessel 10. Signals from the GPS receiver 40 and the IMU 36 are provided to the HCM 24, which together may provide information regarding the heading of the marine vessel 10 and regarding its velocity and acceleration in six degrees of freedom. In one example, the IMU 36 can be a solid state, rate gyro electronic compass that detects the direction of the earth's magnetic field using solid state magnetometers and indicates the marine vessel heading relative to magnetic north. Alternatively or additionally, the propulsion system 20 may include one or more devices that sense vessel speed, such as a pitot tube or a paddle-wheel-type sensor device to sense the speed of the marine vessel 10 with respect to the water. In still other embodiments, vessel speed can be determined, or approximated, based on engine speed, as is known in the relevant art.

In various embodiments, steering actuators 28a-28d may be hydraulic and/or electric actuation systems, as is conventional. The depicted embodiment has four separate steering actuators 28a-28d, one associated with and controlling each propulsion device 12a-12d. In other embodiments, a single steering actuator may control two or more of the propulsion devices 12a-12d. In the depicted in embodiment, the steering actuators 28a-28d are part of a steer-by-wire steering system, where such actuators are in communication with and responsive to a common control module, which in the depicted embodiment is the HCM 24. In other embodiments, the steering system may be comprised of manual links between the input devices (e.g. steering wheel 32 and/or throttle/shift levers 34) and the respective aspects of the propulsion devices, embodiments of which are well-known in the art. In the depicted embodiment, the propulsion devices 12a-12d are independently steerable about their respective steering axes. In other embodiments could be configured as two sets of devices, where the propulsion devices in each set are steered together (and may also be physically connected, such as via a tie bar).

In the depicted embodiment, the steering wheel 32 and the throttle/shift levers 34 function in the conventional manner for drive-by-wire systems, such that rotation of the steering wheel 32 for example activates a transducer that provides a signal to the HCM 24 regarding a desired direction of the marine vessel 10. The HCM 24 in turn sends signals to the ECMs 26a-26d (and/or additional modules if provided). The HCM 24 may also activate and control steering actuators 28a-28d to achieve desired orientations of the propulsion devices 12a-12d. The throttle/shift levers 34 send signals to the HCM 24 regarding the desired gear (forward, reverse, or neutral) of the transmissions 16a-16d and the desired rotational speed of the engines 14a-14d and/or throttle valve positions of the propulsion devices 12a-12d. The HCM 24, in turn, sends signals to the ECMs 26a-26d, which then activate electromechanical actuators associated with the transmissions 16a-16d for corresponding shift and control throttle of the engines 14a-14d accordingly.

A manually operable control device, such as the joystick 30, can also be used to provide signals to the HCM 24. The joystick 30 can be used to allow the operator of the marine vessel 10 to manually maneuver the marine vessel 10, such as to achieve translation or rotation of the marine vessel 10. It should be understood that in alternative examples, the various components 30, 32, 34 may communicate directly with the ECMs 26a-26d or may communicate with one or more additional central control modules executing various steering and/or propulsion control functions.

Figure 2A:
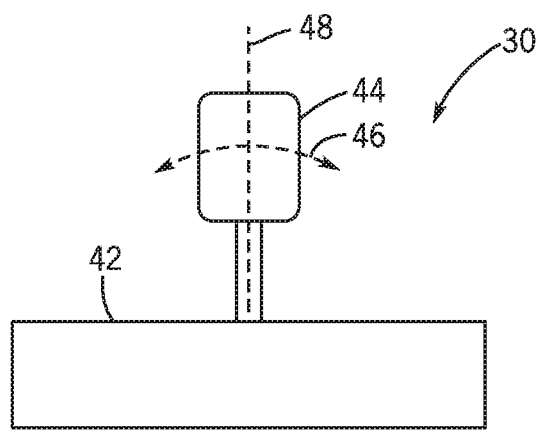
FIGS. 2A and 2B depict an exemplary embodiment of a joystick used in conjunction with the propulsion system of the present disclosure.
Figure 2B:
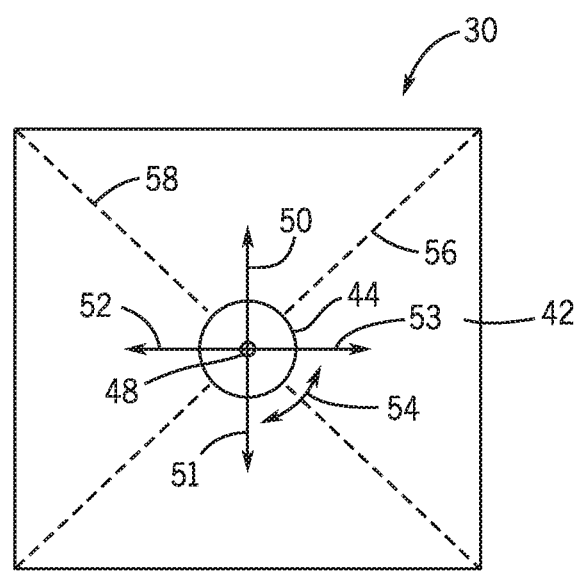

Referring to FIGS. 2A and 2B, exemplary operation of the joystick 30 will now be described. A simplified schematic representation of the joystick 30 is depicted which provides a manually operable control device that can be used to provide a signal that is representative of a desired movement, selected by an operator, of the marine vessel 10. Generally the joystick 30 is intended as a user input device for providing throttle and steering control inputs at relatively low vessel speeds, such as below 10 miles per hour (mph). The example shows a base portion 42 and a handle 44 which can be manipulated by hand. In a typical application, the handle 44 is movable in the direction generally represented by arrow 46 and is also rotatable about an axis 48. It should be understood that the joystick handle 44 is movable by tilting it about its connection point in the base portion 42 in virtually any direction. Although arrow 46 is illustrated in the plane of the drawing in FIGS. 2A and 2B, a similar type of movement is possible in other directions that are not parallel to the plane of the drawing.

FIG. 2B is a top view of the joystick 30. The handle 44 can move, as indicated by arrow 46 in FIG. 2, in various directions which include those represented by arrows 50, 51, 52 and 53. However, it should be understood that the handle 44 can move in any direction relative to its axis 48 and is not limited to the two lines of movement represented by arrows 50, 51, 52 and 53. In fact, the movement of the handle 44 has a virtually infinite number of possible paths as it is tilted about its connection point within the base portion 42. The handle 44 is also rotatable about axis 48, as represented by arrow 54. Note that there are many different types of joystick devices that can be used to provide a signal that is representative of a desired movement of the marine vessel 10, as expressed by the operator of the marine vessel through movement of the handle 44. For example, a keypad, track ball, and/or other similar input device that allows inputs in four or more directions could be used. Likewise, relevant steering input commands may also be controlled by other types of user input devices, such as the steering wheel 32.

With continued reference to FIG. 2B, it can be seen that the operator can demand a purely linear movement either toward port as represented by arrow 52 or toward starboard as represented by arrow 53, a purely linear movement in a forward direction as represented by arrow 50 or reverse direction as represented by arrow 51, or any combination of two of these directions. In other words, by moving the handle 44 along dashed line 56, a linear movement toward the right side and forward or toward the left side and rearward can be commanded. Similarly, a linear movement along line 58 could be commanded. It should be understood that the operator of the marine vessel can also request a combination of sideways or forward/reverse linear movement in combination with a rotation as represented by arrow 54. Any of these possibilities can be accomplished through use of the joystick 30, which communicates with the HCM 24 and eventually with the steering actuators 28a-28d and the ECMs 26a-26d. The magnitude, or intensity, of movement represented by the position of the handle 44 is also provided as an output from the joystick 30. In other words, if the handle 44 is moved slightly toward one side or the other, the commanded thrust in that direction is less than if, alternatively, the handle 44 was moved by a greater magnitude away from its vertical position with respect to the base portion 42. Furthermore, rotation of the handle 44 about axis 48, as represented by arrow 54, provides a signal representing the intensity of desired movement. A slight rotation of the handle 44 about axis 48 would represent a command for a slight rotational thrust about a preselected point on the marine vessel 10. On the other hand, a more intense rotation of the handle 44 about its axis 48 would represent a command for a higher magnitude of rotational thrust.

The joystick 30 can also provide information to the HCM 24 regarding its being in an active state or an inactive state. In many applications, the joystick 30 is controlled such that it is only permitted to be in an active state (and thus to provide control inputs) when the marine vessel 10 is at relatively low speeds, such as below a predetermined vessel speed threshold and/or an engine speed threshold. While an operator is manipulating the joystick 30 to control the steering and propulsion of the marine vessel 10, the joystick 30 is in an active state, or a joysticking mode is enabled. However, if the operator releases the joystick 30 and allows its handle 44 to return to a centered/upright and neutral position, the joystick 30 may revert to an inactive state, deactivating the joysticking mode. In one example, movement of the handle 44 away from the centered state or rotation of the handle 44 about its axis 48, or both, causes the HCM 24 to determine that the joysticking mode is requested. The HCM 24 may then execute certain checks to determine whether the joysticking mode can be activated. Generally, the joystick 30 is used to provide low speed control, such as for docking. Thus, before enabling the joysticking mode, the HCM 24 may verify that the vessel speed is below a predetermined vessel speed threshold and/or that the engine speed is below an engine speed threshold. Additionally, the HCM 24 may verify that the operator thrust demand is below a demand threshold, such as by verifying that the throttle/shift levers 34 are in a detent position before movement of the joystick 30 will result in the HCM 24 determining that the joystick 30 is in the active state and subsequently acting on the commands from the joystick 30. In one example, the detent position of the throttle/shift levers 34 is a forward detent position or a neutral detent position. In another example, the transmissions 16a-16d must all be in neutral before the joysticking mode can be enabled.

Thus, in a joysticking mode, the user may operate the joystick 30 to command the rotational and/or translational movements described herein above with respect to FIGS. 2A and 2B. In another mode, the throttle/shift levers 34 and the steering wheel 32 can be used to send commands to the ECMs 26a-26d and/or the steering actuators 28a-28d via the HCM 24 to operate the propulsion devices 12a-12d in response to such commands, as is conventional. Further, the HCM 24 may also be connected in signal communication with ECMs 26a-26d and/or steering actuators 28a-28d in order to control the propulsion devices 12a-12d in an alternative auto heading mode such that the vessel 10 maintains a desired heading despite the presence of wind, waves, current, or other external factors force the vessel 10 off course. The auto heading function can be implemented, for example, by way of the operator of the marine vessel 10 specifying a desired heading angle with respect to due north using a keypad or an interactive display on the operation console 22. Alternatively, the operator can activate the joystick 30 or steering wheel 32 to orient the marine vessel 10 in the direction of a desired heading and thereafter maintain this desired heading by selecting a heading maintenance input command provided via the operation console. Alternatively, the operator could operate the marine vessel 10 in a waypoint tracking mode, in which the marine vessel 10 is propelled from one waypoint (geographical coordinate) to another at a heading calculated to reach the desired waypoint. A station keeping mode that maintains a desired global position and a desired heading of the marine vessel can also be activated in several ways. For example, the operator of the marine vessel 10 can actuate a button or switch on the operation console 22 that commands the HCM 24 to maintain the current position of the vessel 10. In one example, the station keeping mode is activated when the operator of the marine vessel 10 enables the station keeping mode and the joystick 30 is inactive. If the station keeping mode is enabled, but the joystick 30 is then manipulated by the operator of the marine vessel 10, the HCM 24 may temporarily deactivate the station keeping mode because of the apparent desire of the operator to manipulate the vessel's position manually. However, as soon as the operator releases the joystick 30, return of the joystick 30 to the inactive state in combination with the enabled station keeping mode causes the system 20 to begin maintaining the new heading and position of the vessel 10.

In order to maintain the desired heading of the vessel 10, the HCM 24 must have comparative information regarding the desired heading (input by the operator or calculated based on a desired waypoint) and the actual heading and/or course of the vessel. The control module 24 compares the actual heading and/or course of the vessel 10 detected by, for example, the IMU 36, with the desired heading input by the operator or calculated based on a desired waypoint. If for example, the difference between the desired heading and the actual heading and/or course exceeds a certain threshold value, the HCM 24 may position one or more of the propulsion devices 12a-12d and/or change the thrust provided by one or more of the propulsion devices 12a-12d in order to correct and thereafter maintain the heading at the desired value. For example, the HCM 24 can send a signal via the CAN bus to one or more of the steering actuators 28a-28d to set angles of rotation of the respective propulsion devices 12a-12d with respect to the marine vessel 10, and to the respective ECMs 26a-26d to set engine speed, and/or to set shift position based on the required movement of the vessel 10 to achieve the desired heading. As described herein, such propulsion and steering control may be accomplished using a subset of the propulsion devices 12a-12d, and the propulsion devices 12a-12d utilized can be rotated based on run time.

Figure 3B:
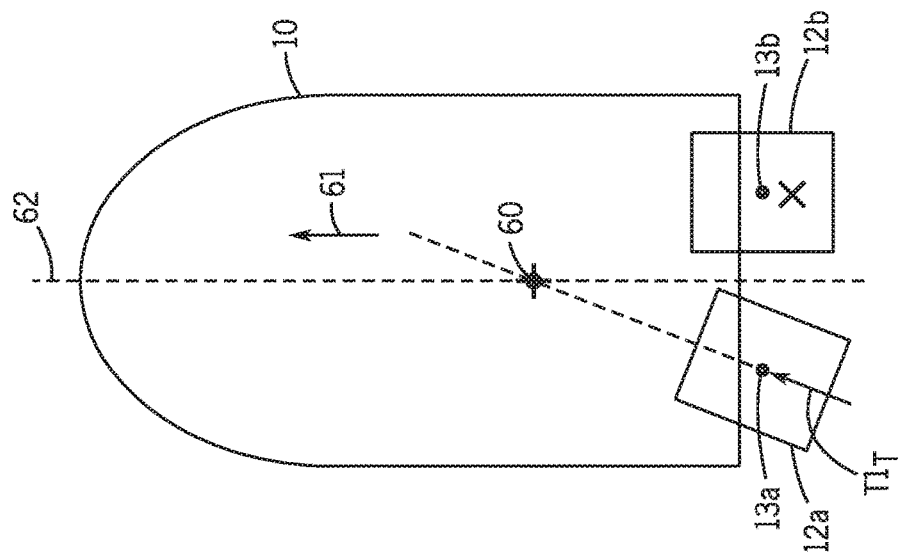
FIGS. 3A and 3B are schematic diagrams illustrating exemplary arrangements of marine propulsion devices causing forward movement of the marine vessel.
Figure 3A:
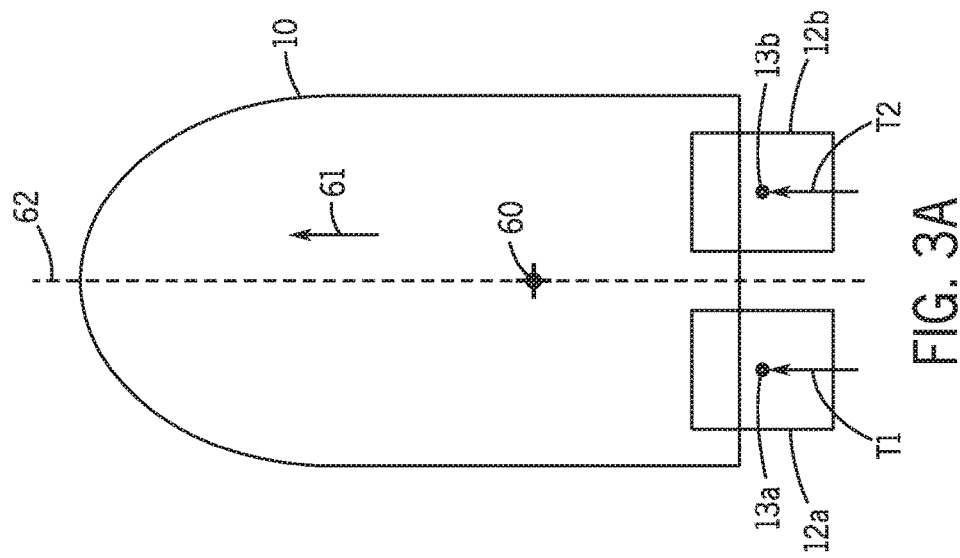

In FIG. 3A, the marine vessel 10 is illustrated schematically with its center of gravity 60, which can be a calibrated preselected point on the marine vessel 10. In other examples, point 60 could instead be an instantaneous center of turn. The center of turn is a function of several factors which comprise the speed of the vessel 10 as it moves through the water, the hydrodynamic forces on the hull of the marine vessel 10, the weight distribution of the load contained within the marine vessel 10, and the degree to which the vessel 10 is disposed below the waterline. The location of the center of turn can be empirically determined for various sets of conditions. For purposes of the below explanation, the point 60 will be referred to as the center of gravity, although similar calculations can be carried out using the center of turn.

In the depicted embodiment, the marine vessel 10 is equipped with two propulsion devices 12a and 12b. First and second steering axes, 13a and 13b, are illustrated for the first and second propulsion devices 12a and 12b. The first and second propulsion devices 12a and 12b are rotatable about the first and second steering axes, 13a and 13b, respectively. The ranges of rotation of the first and second propulsion devices 12a and 12b may be symmetrical with respect to a centerline 62 of the vessel 10. The positioning method of the present disclosure rotates the first and second propulsion devices 12a, 12b about their respective steering axes 13a, 13b, adjusts their operation in forward or reverse gear, and adjusts the magnitude of their thrusts T1, T2 (for example, by adjusting engine speed and/or propeller pitch or transmission slip) in an efficient manner that allows rapid and accurate maneuvering of the marine vessel 10. The rotation, gear, and thrust T1 magnitude of one propulsion device 12a can be varied independently of the rotation, gear, and thrust T2 magnitude of the other propulsion device 12b.

FIG. 3A illustrates a thrust orientation that is used when it is desired to move the marine vessel 10 in a forward direction represented by arrow 61, with no movement in either a right or left direction and no rotation about its center of gravity 60. This is done by rotating the first and second propulsion devices 12a and 12b into an aligned position, in which their thrust vectors T1 and T2 are parallel to one another. As can be seen in FIG. 3A, the first and second thrust vectors, T1 and T2, are equal in magnitude and are directed in the same forward direction. This creates no resultant rotation about the center of gravity 60 and no resultant movement in either the left or right directions. Movement in the direction represented by arrow 61 results from all of the vector components (described further herein below) of the first and second thrust vectors T1 and T2 being resolved in a direction parallel to arrow 61. The resultant thrust components parallel to arrow 61 are additive and together provide net forward thrust to the marine vessel 10 in the direction of arrow 61.

The inventors have recognized that in many light load and/or low speed applications, the same total thrust magnitude and direction can be accomplished with a subset of the propulsion devices, which in this embodiment is just one propulsion device, 12a or 12b. FIG. 3B exemplifies an arrangement where propulsion device 12a is providing the thrust equivalent to that of both propulsion devices in FIG. 3A. The new thrust vector $T1_T$ is calculated to produce the equivalent total thrust in direction of arrow 61 as provide by T1 and T2 in FIG. 3A.

As illustrated in FIGS. 4A and 4B, when a rotation of the marine vessel 10 is desired in combination with linear movement, the propulsion devices 12a, 12b are rotated about the respective first and second steering axes 13a, 13b to steering angles θ with respect to the centerline 62 so that their thrust vectors intersect at a point on the centerline 62. Although thrust vector T1 is not shown in FIG. 4A for purposes of clarity (see FIG. 4B for its magnitude and direction), its associated line of action 68 is shown intersecting with a line of action 66 of thrust vector T2 at a point 64. Because the point 64 is not coincident with the center of gravity 60, an effective moment arm M1 exists with respect to the thrust T1 produced by the first propulsion device 12a. The moment about the center of gravity 60 is equivalent to the magnitude of the thrust vector T1 multiplied by dimension M1. Moment arm M1 is perpendicular to dashed line 68 along which the first thrust vector T1 is aligned. As such, it is one side of a right triangle which also comprises a hypotenuse H. It should also be understood that another right triangle in FIG. 4A comprises sides L, W, and the hypotenuse H. So long as the propulsion devices 12a, 12b are rotated about their respective steering axes 13a, 13b by the same angle θ, a moment arm M2 (not shown for purposes of clarity) of equal magnitude to moment arm M1 exists with respect to the second thrust vector T2 directed along line 66.

With continued reference to FIG. 4A, those skilled in the art will recognize that the length of the moment arm M1 can be determined as a function of steering angle θ; angle Φ; angle π; the distance between the first and second steering axes 13a and 13b; and the perpendicular distance L between the center of gravity 60 and a line extending between the first and second steering axes 13a, 13b. The length of the line extending between the first steering axis 13a and the center of gravity 60 is the hypotenuse H of a right triangle and can easily be determined using the Pythagorean theorem given L and W, which are known and saved in the memory of the HCM 24. The magnitude of θ is calculated as described herein below with respect to equations 1-2. The magnitude of angle Ω is 90−θ. The magnitude of angle Φ is equivalent to the arctangent of the ratio of length L to the distance between the first steering axis 13a and the vessel's centerline 62, which is identified as W. The length of the moment arm M1 can be mathematically determined by the control module 24 using the length of line H and the magnitude of angle π (which is Ω−Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 4A shows the vector components of the second thrust vector T2. As illustrated, second thrust vector T2 is oriented along line 66, which is at steering angle θ with respect to the centerline 62. The second thrust vector T2 can be resolved into components, parallel and perpendicular to centerline 62, that are calculated as functions of the steering angle θ. For example, the second thrust vector T2 can be resolved into a forward-directed force F2Y and a horizontally-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the marine propulsion system 20 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Although the respective lines are not all shown in FIG. 4A, effective moment arms M1, M2 exist with respect to the first and second thrust vectors T1, T2 and the center of gravity 60, but they cancel each other out. Therefore, no total moment, or rotational force, is exerted on the marine vessel 10 and the forward additive thrust vector components add together to effectuate a total forward thrust on the marine vessel 10.

If, on the other hand, the moments M1 and M2 do not cancel, such as if on of the marine propulsion devices is not operating, then a rotational force would be exerted on the marine vessel 10 and it would rotate. Where one of the propulsion devices 12a, 12b is off, such as depicted in FIGS. 3B and 4B, the vector component of the deactivated device is zero. As shown in FIG. 4B, a rotational force (represented by arrow 70) is then imposed on the marine vessel 10 causing it to rotate about its center of gravity 60. Depending on which propulsion device is turned off, the rotational force 70 can be imposed in either rotational direction—i.e., the clockwise (CW) or counterclockwise (CCW).

Thus, if one of the propulsion devices 12a or 12b is turned off and no other change is made to the position of the remaining propulsion device, as exemplified in FIG. 4B, then a rotational force is exerted on the marine vessel 10, as represented by arrow 70 in FIG. 4B. This rotational force 70 is a result of the unbalanced moment arm M1, M2 from the propulsion device 12a, 12b that is still on (the remaining propulsion device). The moment arm M1, M2 grows larger as the angle θ gets smaller, in other words as the force vector T1 approaches a parallel position represented by dashed line 68'. Likewise, the moment arm M1, M2 of the remaining propulsion device 12a, 12b gets smaller as the angle θ approaches zero and the force vector T1 approaches parallel with the hypotenuse H.

The thrust output of the remaining propulsion device(s) must meet the user's demand, both in magnitude and direction. Thus, when one propulsion device 12a or 12b is shut off and the operator thrust demand remains the same, the magnitude and angle of the steering position and thrust output of the remaining propulsion device 12a or 12b needs to be adjusted so that the remaining thrust vector, exemplified as $T1_T$ equal to the previous total thrust vectors T1+T2 (or the previous total thrust forces FX and FY) when both propulsion devices 12a and 12b were operating. Explanation is shown with reference to the example in FIG. 4B. Where the user continues to demand the same forward thrust (represented at arrow 61) and the second propulsion device 12b is turned off, the remaining propulsion device 12a must be rotated in the clockwise direction so that no rotational force is created. The moment arm M1 must be reduced to zero by aligning the respective line of action 68 so that it intersects with the center of gravity 60, as is exemplified in FIG. 3B. Thus, the FX component of the thrust vector $T1_T$ just counteracts the horizontal forces of the water on the marine vessel 10, and the net force on the marine vessel is only an FY force in the forward direction. The magnitude of the thrust vector $T1_T$ of the remaining propulsion device 12a is also adjusted to provide sufficient thrust to meet the operator thrust demand, which is exemplified here by forward arrow 61.

The same concepts apply to steering in other directions, which may be forward or backward at any angle, or in either lateral direction. However, in embodiments where the propulsion system 20 includes only two propulsion devices 12a and 12b, there are limitations to the propulsion directions that can be accomplished with only one of the propulsion devices 12a and 12b. For example, a straight lateral, or sideways propulsion may not be effectuated with only one propulsion device, and thus both propulsion devices would be operated to carry out a propulsion demand in the sideways direction. However, in embodiments with three or more propulsion devices 12, two propulsion devices can be operated at any one time to carry out a steering and propulsion command in any direction. In general, in the low speed and light load conditions discussed herein, the operator thrust demanded (such as by throttle levers 34 or joystick 30) or by the control module (such as when in the auto heading or station keeping mode) can be met by a subset of the propulsion devices 12 (e.g., a subset of 12a-12d). Depending on the vessel speed and the operator thrust demand, various subsets of the available propulsion devices 12a-12d may be selectively turned off. Depending on the value of the thrust demand, the HCM 24 may determine that such demand may be met by a certain subset of the available propulsion devices 12.

Figure 5:
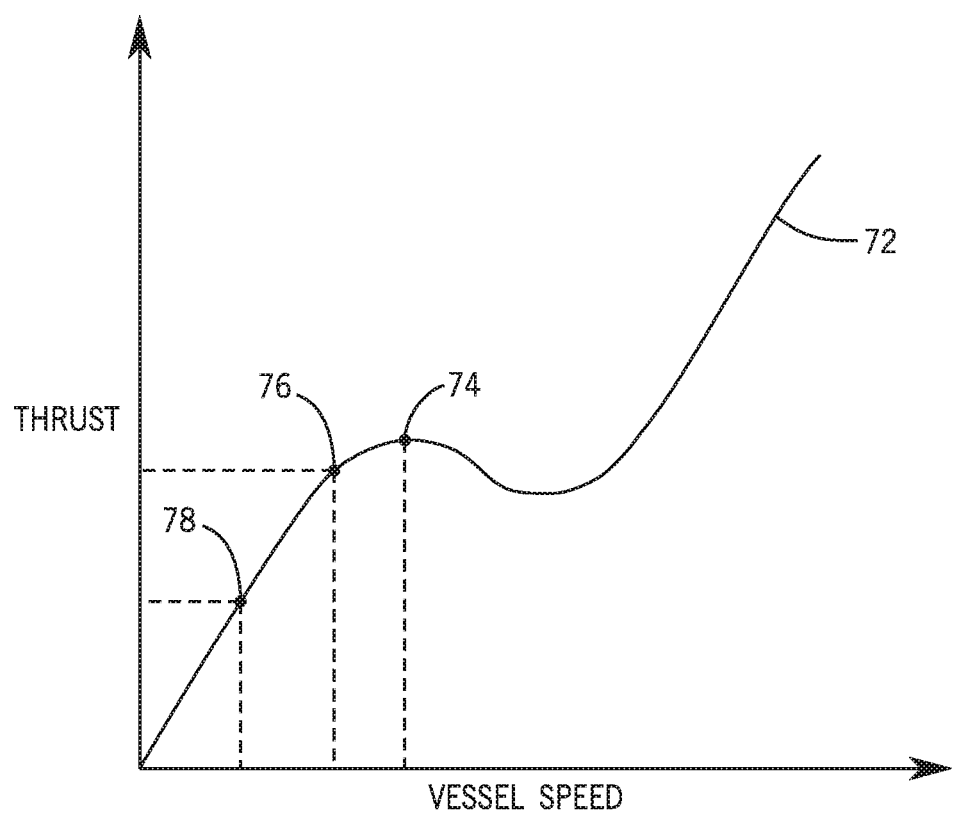
FIG. 5 is a graph depicting an exemplary boat load curve exemplifying various thresholds according to the disclosure.

FIG. 5 depicts an exemplary boatload curve for a particular marine vessel 10. Each marine vessel configuration may have a different boatload curve 72, which may be determined as part of the calibration and control strategy for each marine vessel configuration. In the depicted embodiment, the required thrust needed to achieve a vessel speed increases up to the peak 74, which is where the vessel gets on plane. At speeds just above the planing speed marked at peak 74, the relationship between thrust and speed changes such that less thrust is required to maintain a given vessel speed.

Low speed and light load conditions may be defined as those vessel speed and thrust values on the curve 72 below the peak 74, which are the vessel speeds below the planing speed, or planing threshold of the marine vessel 10. In the depicted example, a maximum threshold at which the disclosed control strategy is applied may be set below the planing speed, such as exemplified by the point 76. Below the threshold point 76, which represents a threshold vessel speed and thrust, the HCM 24 may determine whether at least one of the two or more propulsion devices 12 on the marine vessel can be turned off, and may adjust the thrust output of the remaining propulsion devices in order to meet the operator, throttle, and steering demand. In certain embodiments, multiple thresholds may be set at which the HCM 24 may progressively turn off more of the propulsion devices, such as where three or more propulsion devices are present in the system 20. For example, point 76 represents a first vessel speed threshold and thrust demand threshold below which the HCM 24 may operate using a first subset of the available propulsion devices; and point 78 represents a second vessel speed and thrust demand threshold below which the HCM 24 turns off a larger subset of the available propulsion devices. For example, in an embodiment with three available propulsion devices 12a-12c, the HCM 24 may turn off one propulsion device below the first threshold represented by point 76, and may turn off two of the three propulsion devices below the second threshold represented at point 78 on the curve 72. The thrust output of the remaining one or two propulsion devices would then be adjusted accordingly in order to meet the operator's thrust and steering demand.

Figure 6:
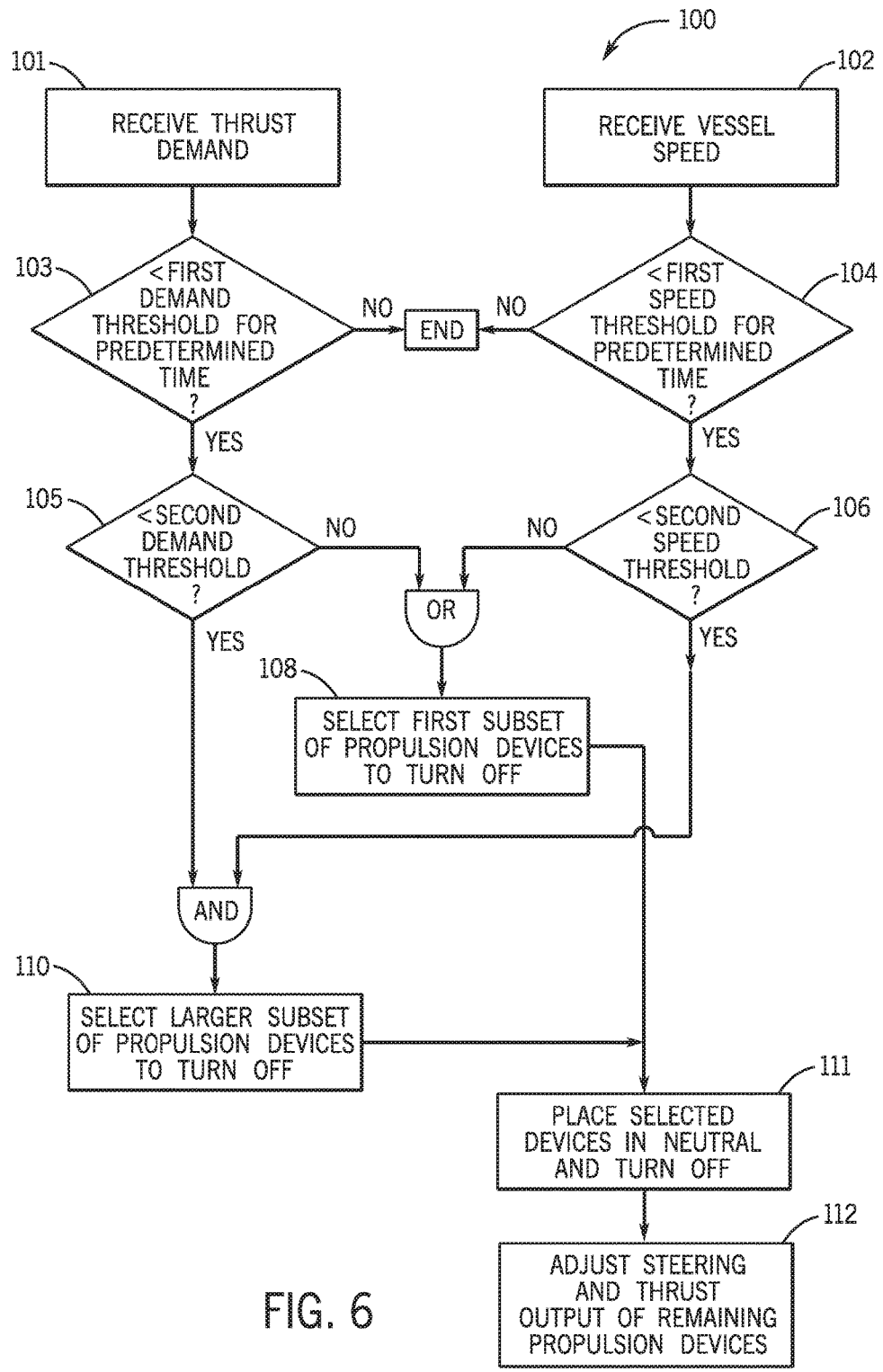
FIG. 6 illustrates an exemplary method of controlling two or more propulsion devices according to the present disclosure.

FIG. 6 depicts one embodiment of a method 100 of controlling three or more propulsion devices on a marine vessel. An operator thrust demand is received at step 101, such as from a joystick 30, one or more throttle levers 34, or from a control algorithm (such as auto heading or station keeping). Step 103 is then executed to determine whether the operator thrust demand is less than the first demand threshold. Further, at step 103 it is determined whether the operator thrust demand remains below the first demand threshold for a predetermined period of time. Similarly, the vessel speed is received at step 102, such as the vessel speed determined based on input from the GPS device 38 or based on input from a speed sensor sensing vessel speed with respect to the water. Step 104 is executed to determine whether the vessel speed is below the first speed threshold, and whether it has remained below the first speed threshold for a predetermined period of time. For example, the predetermined period of time at steps 103 and 104 may be the same periods of time. In general, the threshold periods of time are set to verify that the operator is not merely transitioning between gears, such as from forward gear to reverse gear, or otherwise preparing to input a steering command.

If all of the conditions at steps 103 and 104 are not satisfied, then the inquiry is ended and all propulsion devices remain running. If the requirements at steps 103 and 104 are satisfied, then steps 105 and 106 are executed to determine whether the operator thrust demand is below a second demand threshold and the vessel speed is below a second speed threshold. In certain embodiments, requirements may also be imposed regarding the amount of time that the values remain below the respective thresholds. If any of the requirements of steps 105 or 106 are not met, then the control module, such as the HCM, operates to turn off a first subset of the propulsion devices, which is at least one of the three or more propulsion devices. If all of the requirements of steps 105 and 106 are satisfied, then step 110 is executed to select a larger set of propulsion devices to turn off.

For example, the subset of propulsion devices to be turned off may be selected based on the cumulated run time on each device, such as the total number of run hours of each of the propulsion device or the number of run hours since their last service date. Alternatively or additionally, the propulsion devices to be turned off may be selected based on the steering and/or thrust inputs demanded by the user. For example, the HCM 24 may be configured to always keep at least two propulsion devices operating when the marine vessel is in joysticking mode so that all thrust inputs that could be demanded by the user can be met.

The selected propulsion devices are then placed into neutral at step 111 and then turned off. The steering and/or thrust output of the remaining propulsion devices 112 is then adjusted accordingly. In some embodiments, steering adjustments may not be required, such as where propulsion devices are turned off symmetrically about the center line 62 of the marine vessel 10—e.g., where three propulsion devices are present and the center device is turned off or the outer two propulsion devices are turned off, or where four propulsion devices are present and the two outer devices or two inner devices are turned off. In still other embodiments where the steering actuators 28a-28d are mechanically connected to the input devices, such as to steering wheel 32, steering adjustments will not automatically be executed by the HCM. Thus, in such embodiments, the operator will be required to adjust the steering as necessary to maintain a desired heading of the marine vessel 10. In such an embodiment, just the thrust output of the remaining device(s) would be adjusted to meet the operator demand.

Figure 7:
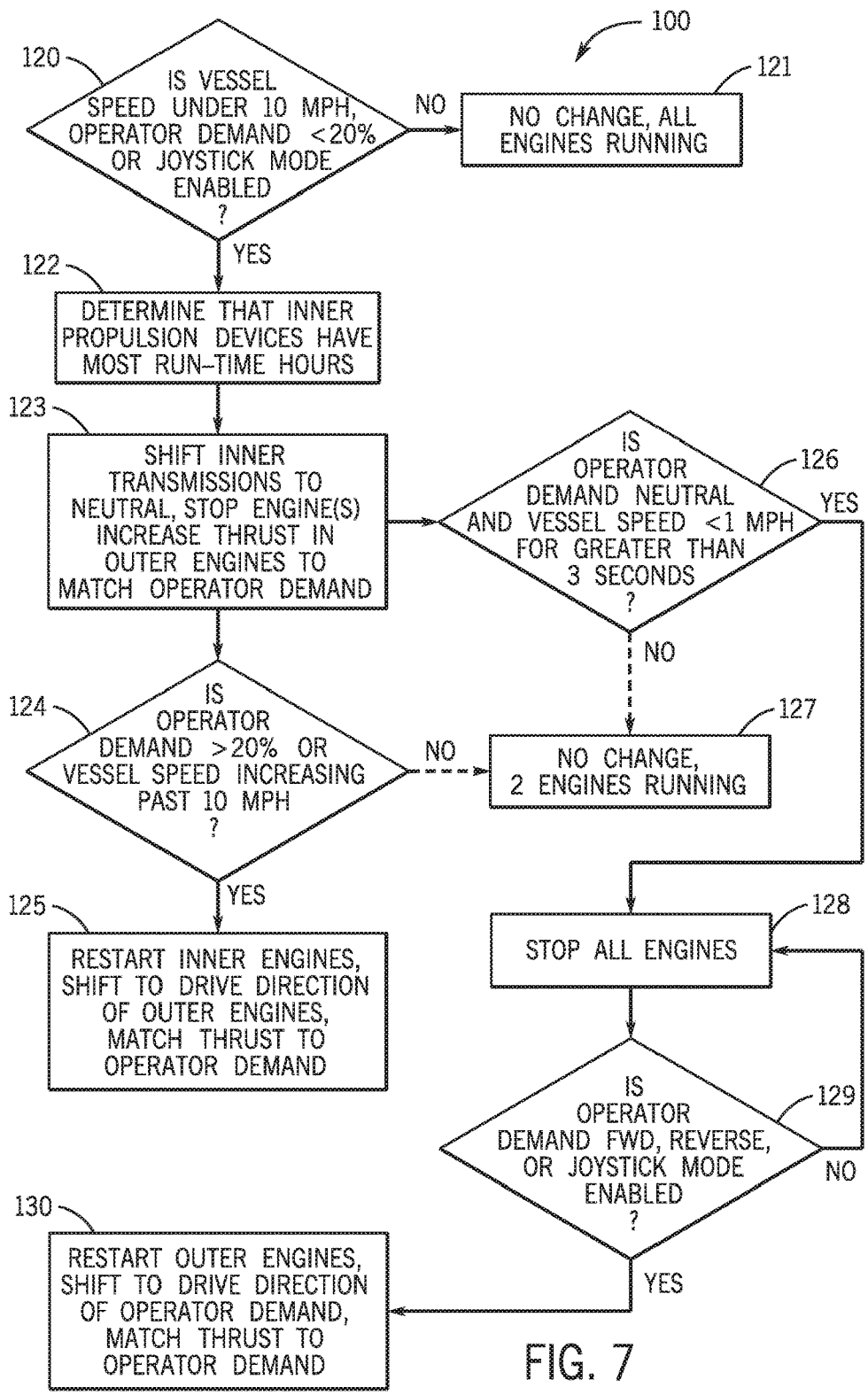
FIG. 7 depicts another embodiment of a method of controlling two or more propulsion devices according to the present disclosure.

FIG. 7 is a flow chart depicting another embodiment of a method 100 of controlling propulsion devices on a marine vessel, and specifically for controlling four or more propulsion devices 12a-12d on a marine vessel 10. At step 120, instructions are executed to determine whether the vessel speed is below a predetermined speed threshold (which in the depicted embodiment is 10 mph) and whether the operator demand is less than a predetermined demand threshold (which in the depicted embodiment is 20% of the maximum available thrust or of the maximum available throttle). Alternatively, if the joystick mode is enabled then the requirements of step 120 may be automatically satisfied. For example, the joystick mode enablement requirements may be at or below the predetermined vessel speed threshold and demand threshold, and thus when the joystick mode is enabled the system may automatically determine that the foregoing thresholds are satisfied. If the requirements of step 120 are not satisfied, then no change is enacted and all engines of the propulsion devices 12a-12d remain running. If the requirements of step 120 are satisfied, then additional steps are executed to select a subset of propulsion devices to turn off. In the depicted embodiment, the propulsion devices to be turned off are selected based on accumulated run time. The accumulated run time of each of the devices are compared to determine which device or devices have the most amount of accumulated run time. For example, the propulsion devices with the highest run time may be selected to be turned off. In an embodiment where symmetry is preferred, the propulsion devices may be turned off in symmetrical pairs by selecting the device with the highest number of hours along with its pair, or mirror, device (i.e. the propulsion device on the opposite side of the boat with the same inner or outer position).

In the explanatory example of FIG. 7, the inner propulsion devices 12b and 12c are selected at step 122 as having the highest number of run-time hours as compared to the outer propulsion devices 12a and 12d. Step 123 is then executed to turn off the inner propulsion devices. Specifically, the transmissions 16b and 16c of the inner propulsion devices 12b and 12c are shifted to neutral and the engines 14b and 14c are stopped. The thrust of the remaining outer propulsion devices 12a and 12d is then increased to match the operator demand. Since the inner propulsion devices 12b and 12c are symmetrical about the center line 62, no steering change is required to match the operator's steering command. Instructions are then executed to ensure that the operator demand does not exceed the predetermined demand threshold and that the vessel speed remains below the predetermined speed threshold, represented at step 124. If any of those conditions are no longer true, then the inner engines 14*b* and 14*c* are restarted at step 125 and the transmissions 16*b* and 16*c* are shifted into the drive directions of the respective outer propulsion devices 12*a* and 12*b*. The thrusts T1-T4 of all of the propulsion devices are then adjusted to match the operator demand.

In certain embodiments, the control module may be configured to assess whether conditions are present where all propulsion devices 12*a*-12*d* may be turned off, such as where all of the running propulsion devices are in a neutral gear for a predetermined amount of time, and/or where an operator thrust demand is equal to zero for a predetermined amount of time. Likewise, such conditions may include determining whether the has been at an idle engine speed for a predetermined amount of time and/or whether a vessel speed is below a drift speed threshold where no thrust is being exerted by any of the propulsion devices 12*a*-12*d*. For example, instructions may be executed as exemplified at step 126 to determine whether the operator demand is neutral, such as that the throttle levers 34 are in a neutral position and the joystick device 30 is disabled. Additionally, instructions may be executed to determine that the vessel speed is below a drift speed threshold for a predetermined period of time, which in the exemplary embodiment is below 1 mph for greater than a predetermined period of three seconds.

If such conditions are not met, then no change is made and the two outer propulsion devices 12*a* and 12*d* remain running at step 127. If the conditions of step 126 are met, then the outer propulsion devices 12*a* and 12*d* are shifted into neutral and turned off at step 128. At that point, all of the propulsion devices 12*a*-12*d* are turned off. Steps are then executed to continually monitor whether the operator has changed a demand input that would require restarting the propulsion devices. For example, the operator may provide a command to shift into forward or reverse gear, such as via the throttle levers 34, and/or may provide a thrust demand by throttle levers 34. Alternatively, the joystick mode may become enabled, such as by the user moving the joystick 30 to provide a shift, throttle, and/or steering command. If any of those conditions are satisfied, then instructions are executed at step 130 to start the outer propulsion devices 12*a* and 12*d* and shift the respective transmissions 16*a* and 16*d* into gear positions commensurate with the operator's thrust demand. The throttle commands to the respective propulsion devices are then operated to provide a thrust that matches the operator demand. Alternatively, depending on the run-time hours of the respective propulsion devices 12*a* and 12*d*, the inner propulsion devices may be started at step 130, such as to balance out the run times of the inner and outer propulsion devices so that they all remain approximately equal.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling two or more propulsion devices on a marine vessel, the method comprising:
   receiving a vessel speed;
   determining that the vessel speed is below a first vessel speed threshold;
   receiving an operator thrust demand;
   determining that the operator thrust demand is below a first demand threshold;
   turning off at least one of the two or more propulsion devices; and
   adjusting a thrust output of at least one remaining propulsion device based on the operator thrust demand.

2. The method of claim 1, further comprising adjusting a steering angle of at least one remaining propulsion device based on an operator steering demand.

3. The method of claim 1, further comprising determining which of the two or more propulsion devices has a highest number of run-time hours, and turning off one or more propulsion devices with the highest number of run-time hours.

4. The method of claim 1, further comprising determining that the vessel speed is below the first vessel speed threshold for a predetermined amount of time, and/or that the operator thrust demand is below the first demand threshold for the predetermined amount of time prior to turning off the at least one of the two or more propulsion devices.

5. The method of claim 1, wherein the steps of determining that the vessel speed is below the first vessel speed threshold and that the operator thrust demand is below the first demand threshold are executed as part of a joysticking mode enablement.

6. The method of claim 1, further comprising:
   determining that all remaining propulsion devices are in a neutral gear position for a predetermined amount of time and/or that the operator thrust demand is zero for the predetermined amount of time;
   determining that the vessel speed is below a drift speed threshold for a predetermined amount of time; and
   turning off the remaining propulsion devices.

7. The method of claim 6, further comprising:
   detecting a non-zero operator thrust demand or a joysticking mode enablement demand;
   restarting the remaining propulsion devices.

8. The method of claim 1, further comprising:
   detecting that the vessel speed is above the first vessel speed threshold, or that the operator thrust demand is above the first demand threshold; and
   restarting the at least one propulsion device that was turned off.

9. The method of claim 1, wherein three or more propulsion devices are on the marine vessel, and further comprising:
   determining that the vessel speed is below a second vessel speed threshold;
   determining that the operator thrust demand is below a second demand threshold;
   turning off at least a second of the three or more propulsion devices;
   adjusting a thrust output of at least one remaining propulsion device based on the operator thrust demand; and adjusting a steering angle of the at least one remaining propulsion device based on an operator steering demand.

10. The method of claim 9, wherein four or more propulsion devices are on the marine vessel, and wherein the remaining propulsion devices are symmetrical about a center axis of the marine vessel.

11. A marine propulsion system on a marine vessel comprising:
   two or more propulsion devices;
   a control module in communication with each of the two or more propulsion devices and configured to:
      determine that a vessel speed is below a first vessel speed threshold;
      determine that an operator thrust demand is below a first demand threshold;
      turn off at least one of the two or more propulsion devices; and
      adjust a thrust output of at least one remaining propulsion device based on the operator thrust demand.

12. The marine propulsion system of claim 11, wherein the control module is further configured to adjust a steering angle of at least one remaining propulsion device based on an operator steering demand.

13. The marine propulsion system of claim 11, wherein the control module is further configured to determine which of the two or more propulsion devices has the highest number of run-time hours, and turn off the one or more propulsion devices with the highest number of run-time hours.

14. The marine propulsion system of claim 11, wherein the control module is further configured to determine that the vessel speed is below the first vessel speed threshold for a predetermined amount of time, and/or that the operator thrust demand is below the first demand threshold for the predetermined amount of time prior to turning off the at least one of the two or more propulsion devices.

15. The marine propulsion system of claim 11, wherein the control module is further configured to:
   determine that all remaining propulsion devices are in a neutral gear position for a predetermined amount of time and/or that the operator thrust demand is zero for the predetermined amount of time;
   determine that an engine speed is at an idle engine speed or that the vessel speed is below a drift speed threshold for a predetermined amount of time; and
   turn off the remaining propulsion devices.

16. The marine propulsion system of claim 15, wherein the control module is further configured to:
   detect a non-zero operator thrust demand or a joysticking mode enablement demand;
   restart the remaining propulsion devices.

17. The marine propulsion system of claim 11, wherein the control module is further configured to:
   detect that an engine speed is above a resume engine speed threshold or that the vessel speed is above the first vessel speed threshold, or that the operator thrust demand is above the first demand threshold; and
   restart the at least one propulsion device that was turned off.

18. The marine propulsion system of claim 11, further comprising:
   three or more propulsion devices on the marine vessel;
   wherein the control module is further configured to determine that the vessel speed is below a second vessel speed threshold;
   determine that the operator thrust demand is below a second demand threshold;
   turn off at least a second of the three or more propulsion devices; and
   adjust a thrust output of at least one remaining propulsion device based on the operator thrust demand.

19. The marine propulsion system of claim 18, wherein the control module is further configured to adjust a steering angle of the at least one remaining propulsion device based on an operator steering demand.

20. The marine propulsion system of claim 11, further comprising:
   four or more propulsion devices on the marine vessel; and
   wherein the control module is further configured to selectively turn off the at least one propulsion device such that the remaining propulsion devices are symmetrical about a center axis of the marine vessel.

* * * * *